US011673354B2

(12) United States Patent
Syfko

(10) Patent No.: US 11,673,354 B2
(45) Date of Patent: Jun. 13, 2023

(54) CURING REPAIR RESIN

(71) Applicant: Belron International Limited, Egham (GB)

(72) Inventor: Paul Syfko, Westerville, OH (US)

(73) Assignee: Belron International Limited, Egham (GB)

(*) Notice: Subject to any disclaimer, the term of this patent is extended or adjusted under 35 U.S.C. 154(b) by 487 days.

(21) Appl. No.: 16/650,379

(22) PCT Filed: Sep. 25, 2018

(86) PCT No.: PCT/GB2018/052719
§ 371 (c)(1),
(2) Date: Mar. 24, 2020

(87) PCT Pub. No.: WO2019/063986
PCT Pub. Date: Apr. 4, 2019

(65) Prior Publication Data
US 2020/0230900 A1    Jul. 23, 2020

(30) Foreign Application Priority Data

Sep. 26, 2017  (GB) .................................. 1715588
Oct. 24, 2017  (GB) .................................. 1717463

(51) Int. Cl.
| B29C 73/00 | (2006.01) |
| C08F 2/46 | (2006.01) |
| C08F 2/50 | (2006.01) |
| C08G 61/04 | (2006.01) |
| B29C 73/02 | (2006.01) |
| B29C 35/08 | (2006.01) |
| B32B 17/10 | (2006.01) |
| C08L 33/10 | (2006.01) |
| C08K 5/092 | (2006.01) |
| B29L 31/30 | (2006.01) |
| C08K 5/00 | (2006.01) |
| C08K 5/101 | (2006.01) |
| C08K 5/5419 | (2006.01) |

(52) U.S. Cl.
CPC ........ B29C 73/025 (2013.01); B29C 35/0805 (2013.01); B32B 17/10963 (2013.01); C08K 5/092 (2013.01); C08L 33/10 (2013.01); *B29C 2035/0827* (2013.01); *B29L 2031/3052* (2013.01); *C08K 5/005* (2013.01); *C08K 5/0025* (2013.01); *C08K 5/101* (2013.01); *C08K 5/5419* (2013.01)

(58) Field of Classification Search
CPC ...... C08K 5/092; C08K 5/101; C08K 5/0025; C08K 5/005; C08K 5/5419; B29C 73/025; B29C 35/0805; B29C 2035/0827; B32B 17/10963; C08L 33/10; B29L 2031/3052

USPC ...... 264/36.21, 36.1; 522/6, 189, 184, 71, 1; 520/1
See application file for complete search history.

(56) References Cited

U.S. PATENT DOCUMENTS

| 4,975,690 A | 12/1990 | Torres |
| 2003/0002008 A1 | 1/2003 | Inoue et al. |
| 2004/0202458 A1 | 10/2004 | Boyle et al. |
| 2006/0104069 A1 | 5/2006 | Beveridge et al. |
| 2007/0269747 A1 | 11/2007 | Bahadur et al. |
| 2010/0012857 A1 | 1/2010 | Wanstrath et al. |
| 2011/0278772 A1 | 11/2011 | Inamiya et al. |
| 2012/0327345 A1 | 12/2012 | Inoue et al. |
| 2014/0065254 A1 | 3/2014 | Schuepbach et al. |

FOREIGN PATENT DOCUMENTS

| CN | 1962224 B | 4/2000 | |
| CN | 106281176 | * 1/2017 | |
| CN | 106281176 A | 1/2017 | |
| EP | 1227927 B1 | 2/2004 | |
| RU | 2425752 C2 | 8/2011 | |
| WO | 2011109602 A2 | 9/2011 | |
| WO | WO-2011109602 A2 | * 9/2011 | ............. B29C 73/02 |
| WO | WO-2012124833 A1 | * 9/2012 | ......... B32B 37/1284 |
| WO | 2015040073 A1 | 3/2015 | |
| WO | 2019071350 A1 | 4/2019 | |

OTHER PUBLICATIONS

Hong et al, WO 2012124833 Machine Translation, Sep. 20, 2012 (Year: 2012).*
Sun et al, CN 106281176 Machine Translation, Jan. 4, 2017 (Year: 2017).*
International Search Report and Written Opinion of PCT App No. PCT/GB2018/052719, dated May 6, 2019, 8 pages.
Search Report for GB App. No. GB1715588.8, dated Mar. 19, 2018, 4 pages.
Search Report for GB App. No. GB1815595.2, dated Mar. 12, 2019, 4 pages.
Search Report for GB App. No. GB1815595.2, dated Jun. 21, 2019, 4 pages.
Search Report for GB App. No. GB1815595.2, dated Oct. 30, 2019, 4 pages.
BR Exam Report & Search Report dated Jul. 13, 2022 of Application No. BR112020002108-3.

(Continued)

*Primary Examiner* — Jessica Whiteley
(74) *Attorney, Agent, or Firm* — Gordon & Jacobson, P.C.

(57) ABSTRACT

The present invention provides a repair resin composition for repairing breaks in a vehicle windscreen and curing units for curing the repair resin after it has been inserted into the break. The present invention also provides a method of repairing a vehicle windscreen, comprising inserting a resin into a repair zone, wherein the resin comprises a photoinitiator that activates when exposed to light of an activation wavelength, wherein the activation wavelength is between 370 nm and 425 nm, and curing the resin by emitting light including light within the activation wavelength range onto the repair zone.

40 Claims, 2 Drawing Sheets

(56) References Cited

OTHER PUBLICATIONS

GB Corrected Search Report dated Apr. 25, 2022 of Application No. GB2203025.8.
CN Examination Report 2 dated May 16, 2022 of Application No. CN201880061788.3.
EP Examination Report dated Jun. 30, 2022 of Application No. EP18779007.6.
GB Examination Report and Search Report dated May 24, 2022 of Application No. GB2205966.1.
CL Office Action dated Feb. 7, 2022 of Application No. CL202000680.
CN Examination Report dated Sep. 23, 2021 of Application No. CN201880061788.3.
GB Examination Report dated Aug. 24, 2021 of Application No. GB1815595.2.
GB Examination Report and Search Report dated Mar. 24, 2022 of Application No. GB2203024.1.
GB Examination Report and Search Report dated Apr. 25, 2022 of Application No. GB2203025.8.
GC Examination Report 1 dated Jun. 24, 2020 of Application No. GC2018-36086.
GC Examination Report 2 dated Oct. 31, 2021 of Application No. GC2018-36086.
ID Office Action dated Dec. 31, 2021 of Application No. ID P00202001552.
RU Office Action dated Mar. 28, 2022 of Application No. RU 2020109545/04(015738).
RU Office Action dated Aug. 22, 2022 of Application No. 2020109545/04015738.
RU Search Report dated Aug. 12, 2022 of Application No. 2020109545/04.

* cited by examiner

CURING REPAIR RESIN

CROSS-REFERENCE TO RELATED APPLICATIONS

This application is the national stage of International Patent Application No. PCT/GB2018/052719, filed on Sep. 25, 2018, which claims priority to GB Appl. No. 1715588.8, filed on Sep. 26, 2017 and GB Appl. No. 1717463.2, filed on Oct. 24, 2017, the entire contents of which are herein incorporated by reference in their entireties.

BACKGROUND

The present invention relates to apparatus and methods for curing resin used to repair cracks or breaks in a vehicle windscreen, including resin compositions for use in repairing windscreens.

BACKGROUND

Vehicle windscreens often become damaged due to the deflection of small projectiles or debris, such as rocks, from a road onto the windscreen. The impact of these small projectiles or debris can cause a crack, break or chip to form in the windscreen. If the damaged zone meets certain requirements, for example the break is not too large or too deep, then the windscreen can be repaired rather than replaced. The repair is cheaper and more convenient for the user.

It is known to insert resin into a break in a vehicle windscreen to fill and repair it. Manually and automatically operated devices for repairing a windscreen using resin are disclosed in WO2015/040073 or EP1227927. These devices at least partially evacuate the repair area before inserting the resin and then apply pressure to force the resin into the repair zone.

After the resin has been inserted into the break the resin is usually cured to cure it from a liquid into a solid, thereby completing the repair process. The repair resin generally comprises an oligomer base material that gives the resin its structure, a monomer used to adjust viscosity and provide the desired physical properties of the resin and a photoinitiator which starts the curing process.

A photoinitiator is a molecule or compound which creates reactive particles, such as free radicals, when exposed to light of a particular wavelength, which may be called the activation wavelength. The reactive particles released then cause the monomers and oligomers in the resin to combine and form larger compounds. This results in the liquid resin becoming a solid.

The curing process is usually carried out by a curing unit positioned above the damaged area of the windscreen. The curing unit emits light of the activation wavelength which initiates the curing of the resin.

The light needs to be of the correct activation wavelength and intensity to initiate curing of the specific resin used and to ensure sufficient transmission of the light through the windscreen. Typically, curing units used in windscreen repair use UV light having a wavelength of between 300 nm to 350 nm. WO2011109602 specifies an LED curing unit arranged to emit 2 separate wavelengths, a first at 365 nm, and a second at 395 nm. The 395 nm wavelength is stated as enabling the curing unit to be used from the inside surface of the windscreen although the document does not disclose the composition of a resin that would be practically suitable for use with such a wavelength. The resin described in the document appears also suitable for curing at the 365 nm wavelength.

If the resin is incorrectly or inadequately cured then the repair will be of lower quality. This may then result in the windscreen subsequently needing to be replaced, which is costly and inconvenient.

It is also important to minimise any stress applied to the repair (or damaged) are of the windscreen during the curing process. An increase in stress will also make the repair less effective.

There is therefore a need for an improved resin curing process which increases the quality of vehicle windscreen repairs.

SUMMARY

According to a first aspect of the present invention there is provided a method of repairing a vehicle windscreen, comprising:
    inserting a resin into a repair zone, wherein the resin comprises a photoinitiator that activates when exposed to light of an activation wavelength, wherein the activation wavelength is between 370 nm and 425 nm; and
    curing the resin by emitting light including light within the activation wavelength range onto the repair zone.

The present invention therefore uses a resin comprising a photoinitiator which activates upon exposure to light of a longer wavelength than photoinitiators in known windscreen repair resins. This means that more of the light emitted from the curing unit within the same activation wavelength range of the photoinitiator is transmitted to penetrate deeper into the windscreen, whilst the light still has sufficient energy to cure the resin in a short exposure time. Thus, the method of the present invention provides more effective curing and consequently a higher quality repair of the windscreen. The higher than normal wavelength selected in accordance with the present invention penetrates to the resin in the base of the crack or break and enables the entire volume of the resin in the crack or break to be cured rather than preferentially only the resin in the uppermost portion of the crack or break which is typically the situation for conventional curing techniques using lower UV wavelengths. For example curing at 365 nm from the exterior of the windscreen as described in WO20110962 would less preferentially cure resin situated in the base of the crack or break (i.e. that portion of the crack or break positioned furthest from the exterior surface of the windscreen).

The activation wavelength is defined as the wavelength of light which excites the photoinitiator and causes the photoinitiator to release particles which initiate curing of the resin. The photoinitiator may be excited by light of a range of activation wavelengths between 370 nm and 425 nm.

Typically an LED light emitter is used which has a single rated activation wavelength within the specified range. By rated activation wavelength we mean that the rating (or technical specification) of the LED is a single wavelength (or narrow wavelength band) within the specified range. There may be of course leakage or trace wavelengths emitted slightly above or below the rated LED activation wavelength (or narrow wavelength band).

Optionally, at least 80% wt of the resin is not reactive to UV light. In other words, only 20% wt or less of the resin absorbs UV light. Ultraviolet (UV) light has a wavelength of between 310 nm to 400 nm.

Optionally, 1 to 5% wt of the resin activates upon exposure to light of the activation wavelength.

In some embodiments, the resin does not comprise any components that absorb UV light other than the photoinitiator.

Optionally, the activation wavelength is between 370 nm to 400 nm.

Optionally, the activation wavelength is between 380 nm and 390 nm. For example, the activation wavelength may be 385 nm.

The light emitted onto the repair zone may have an intensity of at least 10 mW/cm$^2$. Optionally, the light intensity is at least 15 mW/cm$^2$. It is important that the correct intensity of light is delivered to the repair zone. To this end the arm mounting the light is fixed with respect to the windscreen mount and non-deflectable.

Optionally, the light is applied to the repair zone using at least one LED (Light Emitting Diode). In other words, the light source used to cure the resin may comprise at least on LED. It may be advantageous to use LEDs rather than conventional filament or vapour lightbulbs, as these have a lower power consumption, do not require warm up time and produce less waste heat.

Optionally, the at least one LED is spaced at least 15 mm away from the repair zone in a perpendicular direction. For example, the method may include positioning the at least one LED at least 15 mm above or below the repair zone.

Optionally, the at least one LED is spaced less than 10 cm away from the repair zone in a perpendicular direction. If the light source is too far away from the repair zone then the intensity of the light on the repair zone decreases, which can reduce the efficiency of the curing process.

The repair zone may have a diameter of 50 mm or less. This may ensure that the light emitted onto the windscreen has a sufficient exposure area to cover the repair zone. In addition, larger repair areas may require replacement of the windscreen, rather than repair.

Optionally, the step of curing the resin comprises emitting the light onto the repair zone for a predetermined exposure period of at least 60 seconds.

Optionally, the predetermined exposure period is 180 seconds. This may ensure optimum curing of the resin.

The method may include automatically stopping light emission upon expiry of the predetermined exposure period.

The method may comprise the initial step of mounting a curing unit to the windscreen using a mount apparatus spaced at least 10 cm from the centre of the repair zone. The spacing of at least 10 cm may minimise any stress applied to the repair zone from the mount apparatus, thereby increasing the quality of the repair.

The curing unit is configured to emit the light of the activation wavelength onto the repair zone.

Optionally, the mount apparatus may comprise a suction mount. This allows the curing unit to be suctioned onto the windscreen.

Optionally, the suction mount may apply less pressure to the windscreen than many known suction mounts. For example, the suction mount may be of a lower durometer number.

In some embodiments, the method may comprise mounting the curing unit on the interior surface of the windscreen. The interior surface is defined as the surface which faces into the vehicle (i.e. the driver's side of the windscreen).

Optionally, the step of curing the resin comprises emitting the light onto the repair zone from the interior surface of the windscreen.

The method may further comprise applying pressure to the resin inserted into the repair zone during the curing of the resin. In other words, the method may include applying pressure to the repair zone. The pressure may advantageously force the resin to completely fill the repair zone. Any air remaining in the repair zone will also be compressed, making it smaller and less noticeable. This may improve the quality of the curing and thus the repair process.

The method may comprise using a device positioned on the exterior side of the windscreen to apply the pressure to the resin. Thus, a device configured to apply pressure to the resin in the repair zone and the curing unit may be mounted on opposing sides of the windscreen. This allows both devices to communicate with the repair zone simultaneously.

According to a second aspect of the present invention there is provided a curing unit for use in repairing a vehicle windscreen, comprising:

a mount apparatus for securing the curing unit to the windscreen; and a light source configured to emit light onto a repair zone, wherein the mount apparatus is spaced at least 10 cm away from the light source.

In use, the light source is generally positioned above or below the repair zone. Thus, the spacing of at least 10 cm between the light source and the mount apparatus means that the mount apparatus is mounted to the windscreen at least 10 cm away from the repair zone. This separation has been found to minimise any stress applied to the repair zone by the mount apparatus. Applying stress or force to resin which in uncured or partially cured can cause displacement of the resin. This is undesirable as the resin may then not fill the repair zone correctly, resulting in a lower quality repair.

In addition, applying stress to the repair zone can worsen the damage to the windscreen, which should be avoided.

Optionally, the mount apparatus comprises a suction mount.

Optionally, the light source comprises one or more LEDs. For example, the light source may comprise an array or plurality of LEDs. Typically an LED light emitter is used which has a single rated activation wavelength within the specified range. By rated activation wavelength we mean that the rating (or technical specification) of the LED is a single wavelength (or narrow wavelength band) within the specified range. There may be of course leakage or trace wavelengths emitted slightly above or below the rated LED activation wavelength (or narrow wavelength band).

In some embodiments, the mount apparatus and the light source are attached to a support arm. The support arm may extend in a substantially transverse or horizontal direction. In use the support arm may extend substantially parallel to the windscreen.

Optionally, the support arm is spaced at least 15 mm away from a base of the mount apparatus in a perpendicular direction. Thus, in use, the support arm may be at least 15 mm above or below the windscreen. This may ensure that the light emitted from the light source can cover a sufficient area of the windscreen to encompass the repair zone.

Optionally, the curing unit weighs less than 500 g. It is advantageous for the curing unit to weight as little as possible as this reduces stress applied to the windscreen via the mount apparatus.

The curing unit may comprise a timer configured to determine a predetermined exposure time of the curing unit. The predetermined exposure time is the duration for which the curing unit emits light. Upon expiry of the predetermined exposure time the light source may be configured to automatically turn off.

Optionally, the curing unit may comprise a power source configured to supply power to the light source. The power source may comprise one or more batteries which may be rechargeable, such as lithium batteries. Alternatively, the power source may comprise a mains power connection.

It should be appreciated that any features of the first aspect of the invention also form part of the second aspect of the invention.

According to a third aspect of the invention there is provided a method of repairing a vehicle windscreen comprising:
  inserting a resin into a repair zone;
  applying pressure to the resin in the repair zone using a device disposed on a first side of the windscreen; and
  curing the resin by emitting light onto the repair zone from a second side of the windscreen, whilst maintaining the pressure applied to the resin.

Thus, the present invention may cure the resin whilst the resin in held under pressure. Conventionally, the device which applies pressure or pressure cycling to the resin is removed from the windscreen before the curing process is initiated. This can allow air to get into the repair zone before the resin is cured. Also, any stress or tension applied to the windscreen or the repair zone while setting up the curing unit, or during curing, can displace the resin and therefore also result in the resin not completely filling the repair zone. As a result of the invention more of the light emitted from the curing unit within the same activation wavelength range of the photoinitiator is transmitted to penetrate deeper into the windscreen, whilst the light still has sufficient energy to cure the resin in a short exposure time. Thus, the method of the present invention provides more effective curing and consequently a higher quality repair of the windscreen. The higher than normal wavelength selected in accordance with the present invention penetrates to the resin in the base of the crack or break and enables the entire volume of the resin in the crack or break to be cured rather than preferentially only the resin in the uppermost portion of the crack or break which is typically the situation for conventional curing techniques using lower UV wavelengths.

In contrast, the present invention maintains the pressure applied to the resin until it is completely cured (i.e. solid). This ensures that the cured resin fills the repair zone and compresses any air gaps to minimise their effects, thus resulting in a higher quality repair.

Optionally, the first side of the windscreen is the exterior of the windscreen and the second side of the windscreen is the interior of the windscreen.

It will be appreciated that any features of the first of second embodiments of the invention may also form part of the third aspect of the invention.

According to a fourth aspect of the present invention there is provided a windscreen repair resin composition comprising:
  30 to 80% wt acrylates;
  4 to 25% wt acids;
  0.5 to 10% wt oxysilanes; and
  1 to 10% wt UV activated photoinitiator.

This composition provides the required structure and viscosity of the resin whilst ensuring that it cures rapidly and effectively upon activation of the photoinitiator.

Optionally, the windscreen repair resin composition may comprise:
  40 to 70% wt acrylates;
  6 to 18% wt acids;
  1 to 5% wt oxysilanes; and
  1 to 7% wt UV activated photoinitiator.

The given components may comprise 100% of the composition. Alternatively, the remaining balance of the composition may be made up of one or more acceptable fillers or adjuvants/ingredients.

It should be appreciated that the 1 to 7% wt UV activated photoinitiator may comprise more than one type of molecule or compound. The photoinitiator may be naturally occurring or manufactured.

Optionally, the photoinitiator is benzyl dimethyl ketal and/or 2,2-dimethoxy-1,2-diphenyl ethanone. For completeness, benzyl dimethyl ketal is also known as 2,2-Dimethoxy-2-phenyl acetophenone.

Optionally, the photoinitiator activates when exposed to light of a wavelength between 370 nm and 425 nm. The photoinitiator may be configured or engineered to activate when exposed to a specific wavelength of light or to a specific range of wavelengths, or it may be a naturally occurring property of the molecule or compound.

Optionally, the photoinitiator activates when exposed to light of a wavelength between 370 nm and 400 nm, or between 380 nm and 390 nm.

Optionally, the resin composition comprises 15 to 20% wt methacrylates. In other words, the 30 to 80% wt or 40 to 70% wt acrylates may comprise 15 to 20% wt methacrylates.

Optionally, the resin composition comprises 6 to 18% wt dicarboxylic acid. In other words, the acid may comprise, or consist of, dicarboxylic acid.

Optionally, the resin composition comprises:
  15 to 20% wt 2-hydroxyethyl methacrylate;
  25 to 49% wt isobornyl acrylate;
  1 to 4% wt maleic acid;
  5 to 14% wt decanedioic acid;
  1 to 4% wt glycidoxypropyltrimethoxysilane; and
  1 to 5% wt benzyl dimethyl ketal.

Optionally, the resin composition comprises:
  15 to 20% wt 2-hydroxyethyl methacrylate;
  25 to 49% wt isobornyl acrylate;
  1 to 4% wt maleic acid;
  5 to 14% wt decanedioic acid;
  1 to 4% wt glycidoxypropyltrimethoxysilane; and
  1 to 5% wt 2,2-dimethoxy-1,2-diphenyl ethanone.

Optionally, the resin composition comprises:
  15 to 20% wt 2-hydroxyethyl methacrylate;
  25 to 49% wt isobornyl acrylate;
  1 to 4% wt maleic acid;
  5 to 14% wt decanedioic acid;
  1 to 4% wt glycidoxypropyltrimethoxysilane; and
  1 to 5% wt in total of a combination of 2,2-dimethoxy-1,2-diphenyl ethanone and benzyl dimethyl ketal.

Thus, the composition may comprise between 1 to 5% wt of benzyl dimethyl ketal, or between 1 to 5% wt of 2,2-dimethoxy-1,2-diphenyl ethanone, or between 1 to 5% wt of a combination of 2,2-dimethoxy-1,2-diphenyl ethanone and benzyl dimethyl ketal. For example, the composition may comprise 1% wt 2,2-dimethoxy-1,2-diphenyl ethanone and 4% wt benzyl dimethyl ketal.

The resin composition may comprise one or more acceptable adjuvants/ingredients up to 100%. In other words, the remaining balance of the composition may be made up of acceptable fillers or adjuvants/ingredients.

The resin composition may not comprise any components that absorb UV light other than the photoinitiator. Optionally, the resin may not comprise any components that absorb light of the activation wavelength of the photoinitiator, other than the photoinitiator itself.

According to a fifth aspect of the present invention, there is provided a windscreen repair resin composition comprising a photoinitiator that activates when exposed to light of an activation wavelength, wherein the activation wavelength is between 370 nm and 425 nm.

This resin composition can only be cured using light which includes light of the activation wavelength, between 370 nm and 425 nm. This activation wavelength is longer than the activation wavelength range of known windscreen repair resins. This is advantageous as, due to the longer wavelength, more of the light of the activation wavelength(s) is transmitted through the windscreen, whilst the light still has sufficient energy to cure the resin in a short exposure time. Thus, the resin of the present invention is more effective cured and consequently results in a higher quality repair of the windscreen.

The resin composition of the fifth aspect of the invention may comprise any features of the fourth aspect of the invention.

According to a sixth aspect of the present invention, there is provided an apparatus for use in repairing a vehicle windscreen, comprising:

a repair resin comprising a photoinitiator that activates when exposed to light of an activation wavelength, wherein the activation wavelength is between 370 nm and 425 nm; and a curing unit configured to emit light of the activation wavelength.

Thus, this apparatus may be used to carry out the method of the first aspect of the invention, and provided the associated advantages thereof.

The curing unit may comprise any of the features of the second aspect of the invention.

The resin composition may be as defined in any embodiment of the fourth or fifth aspects of the invention.

Exemplary embodiments of the present invention are described in greater detail below with reference to the drawings which are partially schematic diagrams.

BRIEF DESCRIPTION OF THE DRAWINGS

FIG. 4—shows the curing unit of FIG. 3 when turned on; and

The skilled person would appreciate that none of these figures are drawn to scale, nor are the relative sizes of any features depicted accurately. The drawings are for illustrative purposes only.

DETAILED DESCRIPTION OF THE PREFERRED EMBODIMENTS

Figure 1:
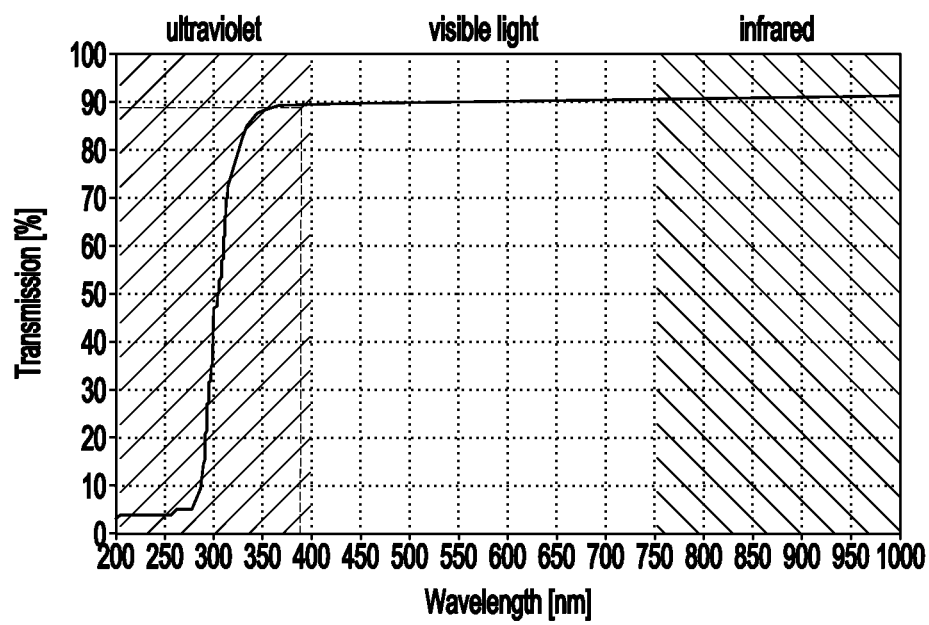
FIG. 1—shows a graph of the transmission of light through a vehicle glazing panel as a function of the wavelength of the light.

FIG. 1 is a diagram showing how the percentage of light transmitted through a vehicle windscreen varies in accordance with the wavelength of the light. As demonstrated, the longer the wavelength of the light, the more light penetrates through the windscreen. However, as the wavelength ($\lambda$) of light increases the energy (e) of the light decreases, as per the below equation:

$$e = \frac{h \cdot c}{\lambda}. \quad 1$$

where h is the Planck constant and c is the speed of light.

The higher the energy of the light the quicker the curing process will be. In order to obtain optimum curing of the resin there needs to be a balance between ensuring sufficient light is transmitted through the windscreen and that the curing light has a high enough energy to activate the resin in an acceptable exposure time.

In one embodiment of the present invention the optimum wavelength is 385 nm±5 nm. This must also be the activation wavelength of the photoinitiator used in the corresponding repair resin. Almost 90% of light with this wavelength is transmitted through a vehicle windscreen, as shown in FIG. 1. In comparison, the mercury vapour bulbs used in known curing units for windscreen repair processes only have about 60% to 70% transmission through the windscreen.

Figure 2:
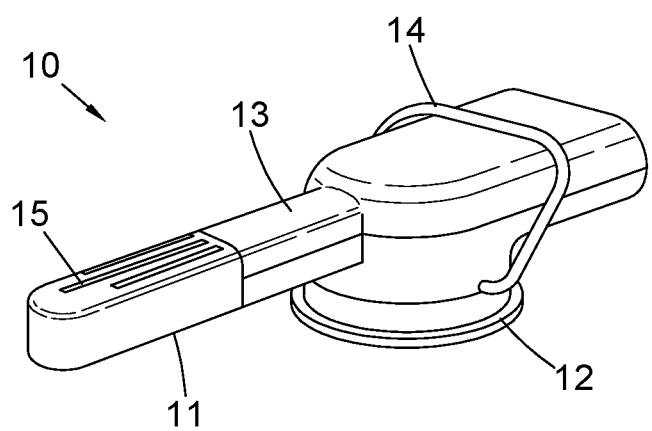
FIG. 2—shows a perspective view of a curing unit according to the present invention.

An embodiment of a curing unit according to the present invention is shown in FIG. 2. The curing unit 10 comprises an LED array 11 connected to the underside of a support arm 13. A suction mount 12 is also attached to the support arm 13. The suction mount 12 is configured to securely mount the curing unit 10 onto a vehicle windscreen.

A handle 14 is attached to the curing unit 10 to be gripped by the user. This aids in removing the suction mount 12 from the windscreen after the curing process has been completed.

The LED array 11 comprises a plurality of LEDs (not shown), each LED configured to emit light of a single specific wavelength between 370 nm to 420 nm. The intensity of the light emitted by the LED array is at least 15 mw/cm$^2$ in order to ensure that sufficient area of the windscreen is illuminated at the required from the emitter positioned above the windscreen. Typically an LED light emitter is used which has a single rated activation wavelength within the specified range. By rated activation wavelength we mean that the rating (or technical specification) of the LED is a single wavelength (or narrow wavelength band) within the specified range. There may be of course leakage or trace wavelengths emitted slightly above or below the rated LED activation wavelength (or narrow wavelength band).

In some embodiments the wavelength may be between 370 nm to 425 nm, or between 380 nm to 390 nm.

The curing unit 10 is configured to be used to cure a windscreen repair resin after the resin has been inserted into a break in the windscreen. The activation wavelength of the resin must be in the range of 370 nm to 425 nm to ensure that it is correctly cured by the light emitted from the curing unit 10. As detailed in relation to FIG. 1, this wavelength range was selected as it provides optimum curing of the resin by obtaining a balance between ensuring sufficient light from the curing unit is transmitted through the windscreen and that the curing light has a high enough energy to activate the resin in an acceptable exposure time.

When cured, the repair resin should ideally have the same mechanical and optical properties as the windscreen itself. As described in the background section, the repair resin comprises a photoinitiator substance which triggers the curing of the other components of the repair resin from a liquid to a solid substance. The photoinitiator must absorb and be activated by the light emitted from the curing unit. The other components of the resin are selected to ensure that they can be cured by the photoinitiator when it is activated and that, upon curing, the solid repair resin has the desired mechanical and optical properties.

The repair resin may comprise benzyl dimethyl ketal and/or 2,2-dimethoxy-1,2-diphenyl ethanone as the photoinitiator(s). These photoinitiators are activated by curing light in the wavelength range of 370 nm to 400 nm, which corresponds to the wavelength of the LED array 11. It will be appreciated by the skilled person that there may be other suitable photoinitiators which could be used in the resin. The photoinitiator activation wavelength is matched to the single rated wavelength emitted by the LED emitter.

The composition of the resin is substantially such that the bulk of the resin will not cure in an enhanced manner at activation wavelengths of 365 nm or less but rather at wavelengths is between 370 nm and 425 nm. Typically at least 80% wt of the resin is not reactive to UV light, but typically 1 to 5% wt of the resin (i.e. the photoinitiator) activates upon exposure to light of the activation wavelength. Put another way, the resin does not effectively comprise any components that absorb the LED emitted wavelength other than the photoinitiator. Also the resin does not effectively comprise any components that absorb light of 365 nm or less.

The resin composition may comprise: 40 to 70% wt acrylates; 6 to 18% wt acids; 1 to 5% wt oxysilanes; and 1 to 7% wt of the photoinitiator(s). This composition provides the required structure and viscosity of the resin whilst ensuring that it cures rapidly and effectively upon activation of the photoinitiator.

In some embodiments, the resin composition may comprise: 15 to 20% wt 2-hydroxyethyl methacrylate; 25 to 49% wt isobornyl acrylate; 1 to 4% wt maleic acid; 5 to 14% wt decanedioic acid; 1 to 4% wt glycidoxypropyltrimethoxysilane; and 1 to 5% wt of the photoinitiator(s), wherein the photoinitiator(s) is/are benzyl dimethyl ketal and/or 2,2-dimethoxy-1,2-diphenyl ethanone.

A plurality of slots or apertures 15 are provided in an upper surface of the support arm 13 above the LED array 11. These slots or apertures 15 are provided to cool the LED array 11 during operation, by allowing waste heat to escape.

The LED array 11 is positioned at least 15 mm above the base of the suction mount 13. This ensures that the light emitted from the LED array 11 creates a large enough exposure area to cover a typical repair zone on a windscreen. In this embodiment, the exposure area has a diameter of 50 mm or less.

After inserting the repair resin into the repair zone on the windscreen, the curing unit 10 is used. When the user turns the LED array 11 on, for example by pressing a start or power button (not shown), the LED array 11 emits light for a predetermined exposure time of 180 seconds. An internal timer device (not shown) controls the predetermined exposure time and automatically switches off the LED array 11 on expiry of the predetermined exposure time. In other embodiments the predetermined exposure time may be any duration of 60 seconds or more.

Figure 3:
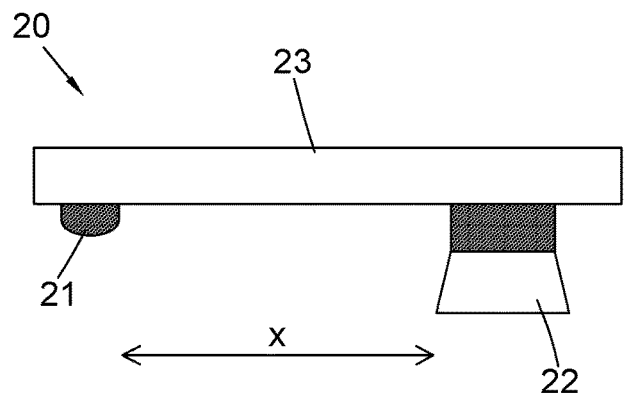
FIG. 3—shows a diagram of a side on view of a curing unit according to the present invention.

Another example of a curing unit 20 is shown in FIG. 3. The curing unit 20 comprises a light source 21 and a suction mount 22, both attached to a support arm 23. The support arm 23 is rigidly fixed with respect to the suction mount and this is important to ensure fixed and consistent positioning of the LED emitter above the windscreen. The support arm 23 extends in a substantially transverse or horizontal direction. The support arm 23 therefore extends substantially parallel to the vehicle windscreen during use. In essence it is important to ensure that the LED emitter is in a fixed positional relationship with respect the suction mount and cannot be varied intentionally or by accident.

The light source 21 is spaced a distance x away from the suction mount 22 along the support arm 23. In this example, the distance x is at least 10 cm. In a particular example, the distance x is 6 inches (15.24 cm). In use, the light source 21 is aligned above or below the damaged portion of the windscreen that needs to be repaired (i.e. the repair zone) (see FIG. 4). The spacing x ensures that the suction mount 22 does not apply stress to the repair zone, which improves the quality of the repair.

The curing unit 20 may be configured to be used to cure a windscreen repair resin according to any resin composition detailed above. For example, the curing unit 20 may be configured to cure a repair resin having the following composition: 30 to 80% wt acrylates; 4 to 25% wt acids; 0.5 to 10% wt oxysilanes; and 1 to 10% wt UV activated photoinitiator.

Figure 4:
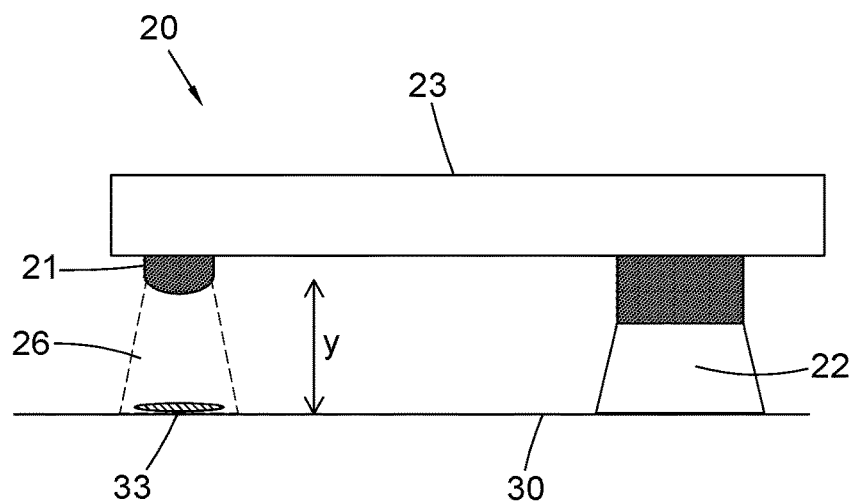

FIG. 4 shows the curing unit 20 of FIG. 3 positioned above a glazing panel 30 with the light source 21 turned on so that light 26 is emitted. The light source 21 is positioned a distance y above the exterior surface of the glazing panel 30.

The distance y is selected to ensure that the light 26 is emitted onto an exposure area on the glazing panel 30 that is sufficient to cover a repair zone 33. The optimum distance y depends on the properties of the light source 21.

The repair zone 33 is the area of the windscreen into which a resin is inserted to repair damage, such as crack or a break. Typically, this is less than 50 mm in diameter. Larger damaged areas or breaks usually necessitate replacement of the windscreen, rather than repair.

Figure 5:
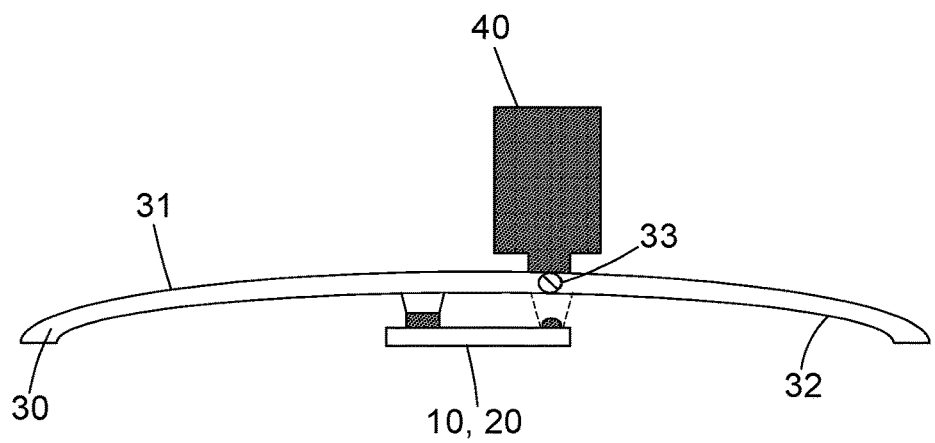
FIG. 5—is a diagram illustrating the curing units of FIG. 2 or 3 in use repairing a vehicle windscreen.

Alternatively, as shown in FIG. 5, the curing unit 10, 20 can be placed on the interior surface of the windscreen. In FIG. 5 the windscreen 30 has an exterior surface 31 and an interior surface 32. The interior surface 32 is the driver's side of the windscreen 30.

The degree of curvature of the windscreen 30 in FIG. 5 is for illustrative purposes only. The windscreen may be flat or of any degree of curvature.

A device 40 is secured on the exterior surface 31 of the windscreen over the repair zone 33. The device 40 is configured to (or to allow the user to) insert a resin into the repair zone 33 and apply pressure, or pressure cycling to the resin. For example, the device 40 may be of the type described in WO2015/040073 or EP1227927.

By mounting the device 40 and the curing unit 10, 20 on opposing sides of the windscreen both devices can communicate with the repair zone 33 simultaneously. This allows the resin to be cured whilst under pressure.

In other embodiments, the device 40 may be secured to the interior surface 32 of the windscreen and the curing unit 10, 20 may be secured to the exterior surface 31 of the windscreen.

The invention claimed is:

1. A method of repairing a vehicle windscreen, comprising:
    inserting a resin into a repair zone, wherein the resin includes a photoinitiator that activates when exposed to light of an activation wavelength, wherein the activation wavelength is between 370 nm and 425 nm; and
    curing of the resin by emitting light including light within the activation wavelength range onto the repair zone;
    wherein the resin comprises:
        30 to 80% wt acrylates;
        4 to 25% wt acids, wherein the acids comprise, or consist of, 6 to 18% wt dicarboxylic acid;
        0.5 to 10% wt oxysilanes; and
        1 to 10% wt UV activated photoinitiator.

2. The method of claim 1, wherein the resin is configured to cure when exposed to light at wavelengths between 370 nm and 425 nm.

3. The method of claim 1, wherein the light is emitted by an LED device and is rated to emit at a single rated wavelength; and the LED device is capable of only emitting at that rated wavelength.

4. The method of claim 1, wherein at least 80% wt of the resin is not reactive to UV light.

5. The method of claim 1, wherein 1 to 5% wt of the resin activates upon exposure to light of the activation wavelength.

6. The method of claim 1, wherein the resin does not comprise any components that absorb UV light other than the photoinitiator.

7. The method claim 1, wherein the activation wavelength is between 370 nm to 400 nm.

8. The method of claim 1, wherein the activation wavelength is in the range between 380 nm and 390 nm.

9. The method of claim 1, wherein the light emitted onto the repair zone has an intensity of at least 10 mW/cm2.

10. The method of claim 1, wherein the light is applied to the repair zone using at least one LED device.

11. The method of claim 10, wherein the at least one LED device is spaced at least 15 mm above the repair zone.

12. The method of claim 10, wherein the at least one LED device is mechanically supported by a mount apparatus that is spaced at least 10 cm away from the at least one LED device in a perpendicular direction.

13. The method of claim 1, further comprising mounting a curing unit to the windscreen using a mount apparatus spaced at least 10 cm from the center of the repair zone.

14. The method of claim 13, wherein the mount apparatus comprises a suction mount.

15. The method of claim 1, further comprising applying pressure to the resin inserted into the repair zone during the curing of the resin.

16. The method of claim 15, comprising using a device positioned on the exterior side of the windscreen to apply the pressure to the resin.

17. The method of claim 1, wherein the photoinitiator is benzyl dimethyl ketal and/or 2,2-dimethoxy-1,2-diphenyl ethanone.

18. The method of claim 1, wherein the photoinitiator activates when exposed to light of a wavelength between 370 nm and 400 nm.

19. The method of claim 1, wherein the photoinitiator activates when exposed to light of a wavelength between 380 nm and 390 nm.

20. The method of claim 1, wherein the acrylates comprise 15 to 20% wt methacrylates.

21. The method of claim 1, wherein the resin does not comprise any components that absorb UV light other than the photoinitiator.

22. The method of claim 1, wherein the resin is configured to cure when exposed to light at an activation wavelength above 370 nm.

23. A method of repairing a vehicle windscreen, comprising:
 inserting a resin into a repair zone, wherein the resin includes a photoinitiator that activates when exposed to light of an activation wavelength, wherein the activation wavelength is between 370 nm and 425 nm; and
 curing of the resin by emitting light including light within the activation wavelength range onto the repair zone;
 wherein the resin comprises:
  15 to 20% wt 2-hydroxyethyl methacrylate;
  25 to 49% wt isobornyl acrylate;
  1 to 4% wt maleic acid;
  5 to 14% wt decanedioic acid;
  1 to 4% wt glycidoxypropyltrimethoxysilane; and
  1 to 5% wt benzyl dimethyl ketal.

24. The method of claim 23, wherein the resin is configured to cure when exposed to light at wavelengths between 370 nm and 425 nm.

25. The method of claim 23, wherein at least 80% wt of the resin is not reactive to UV light.

26. The method of claim 23, wherein 1 to 5% wt of the resin activates upon exposure to light of the activation wavelength.

27. The method of claim 23, wherein the resin does not comprise any components that absorb UV light other than the photoinitiator.

28. The method of claim 23, wherein the light is applied to the repair zone using at least one LED device.

29. A method of repairing a vehicle windscreen, comprising:
 inserting a resin into a repair zone, wherein the resin includes a photoinitiator that activates when exposed to light of an activation wavelength, wherein the activation wavelength is between 370 nm and 425 nm; and
 curing of the resin by emitting light including light within the activation wavelength range onto the repair zone;
 wherein the resin comprises:
  15 to 20% wt 2-hydroxyethyl methacrylate;
  25 to 49% wt isobornyl acrylate;
  1 to 4% wt maleic acid;
  5 to 14% wt decanedioic acid;
  1 to 4% wt glycidoxypropyltrimethoxysilane; and
  1 to 5% wt 2,2-dimethoxy-1,2-diphenyl ethanone.

30. The method of claim 29, wherein the resin wherein the resin is configured to cure when exposed to light at wavelengths between 370 nm and 425 nm.

31. The method of claim 29, wherein at least 80% wt of the resin is not reactive to UV light.

32. The method of claim 29, wherein 1 to 5% wt of the resin activates upon exposure to light of the activation wavelength.

33. The method of claim 29, wherein the resin does not comprise any components that absorb UV light other than the photoinitiator.

34. The method of claim 29, wherein the light is applied to the repair zone using at least one LED device.

35. A method of repairing a vehicle windscreen, comprising:
 inserting a resin into a repair zone, wherein the resin includes a photoinitiator that activates when exposed to light of an activation wavelength, wherein the activation wavelength is between 370 nm and 425 nm; and
 curing of the resin by emitting light including light within the activation wavelength range onto the repair zone;
 wherein the resin comprises:
  15 to 20% wt 2-hydroxyethyl methacrylate;
  25 to 49% wt isobornyl acrylate;
  1 to 4% wt maleic acid;
  5 to 14% wt decanedioic acid;
  1 to 4% wt glycidoxypropyltrimethoxysilane; and
  1 to 5% wt in total of a combination of 2,2-dimethoxy-1,2-diphenyl ethanone and benzyl dimethyl ketal.

36. The method of claim 35, wherein the resin is configured to cure when exposed to light at wavelengths between 370 nm and 425 nm.

37. The method of claim 35, wherein at least 80% wt of the resin is not reactive to UV light.

38. The method of claim 35, wherein 1 to 5% wt of the resin activates upon exposure to light of the activation wavelength.

39. The method of claim 35, wherein the resin does not comprise any components that absorb UV light other than the photoinitiator.

40. The method of claim 35, wherein the light is applied to the repair zone using at least one LED device.

* * * * *